Nov. 26, 1940.  L. KAMENAROVIĆ  2,222,746
CONDUIT COUPLING

Filed Jan. 12, 1938

Inventor:
L. Kamenarović
By E. F. Wenderoth
Atty

Patented Nov. 26, 1940

2,222,746

UNITED STATES PATENT OFFICE 2,222,746

CONDUIT COUPLING

Leone Kamenarovič, Milan, Italy, assignor to Fabbrica Italiana Magneti Marelli Societa Anonima, Milan, Italy, a corporation of Italy Application January 12, 1938, Serial No. 184,674
In Italy January 18, 1937

10 Claims. (Cl. 285—110)

This invention relates to couplings for conduits located on vehicles and particularly for brake conduits on tractor and trailed vehicles in road trains and the like.

In the coupling of this invention the engagement and seal of the coupling members are secured by longitudinal respective motion and compression of the packing rings of said coupling members and the troubles inherent to couplings in which said rings are subject to a frictional action while under compression at the time the coupling members are being engaged with each other are removed; further the coupling of this invention provides for the automatic release of the coupling members at the time a pull over a certain range is operative thereon.

An embodiment of the present invention is shown by way of example on the annexed drawing and:

Figure 1:
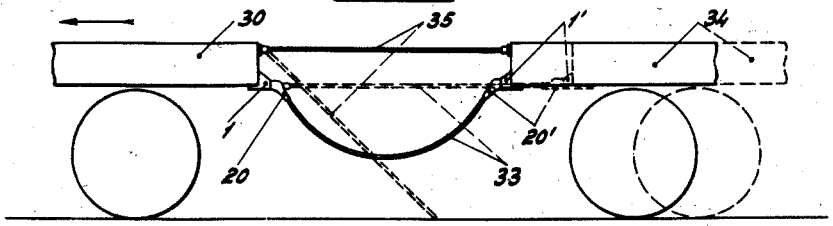
Fig. 1 is a diagrammatic fragmentary side view of adjacent portions of a tractor and a trailed vehicle provided with a coupling of this invention.

In the embodiment illustrated on the drawing the coupling includes a stationary member 1 located on a vehicle frame 30; said member provides two ducts 2 and 3 controlled by a valve 4 adapted to be actuated by a suitable handle not shown operative on the square-section head 4' of said valve 4; seal rings 5 are located at the outlet of said ducts and also automatic valves 6 which are energized by springs 7 biasing them into cut off position and are held in open position when normal operative conditions exist by cooperating fingers 8 fast on the separable member 20 of the coupling as hereinafter described.

The stationary coupling member 1 further includes at its top a hook or hinge seat 9; at the bottom of said member 1 a pawl 11 is pivoted by means of a transverse spindle 10 fast in member 1, said pawl 11 being fast with a head 11' and a handle 12; a plunger 13 mounted to reciprocate in a cylindrical chamber 14 integral with member 1 acts on said head 11' under the action of a spring 15 operative on said plunger 13.

The plunger 13 also controls a contactor inserted in an electric circuit energizing an indicator intended to give a warning when the trailed vehicle happens to be disconnected from the tractor.

Figure 2:
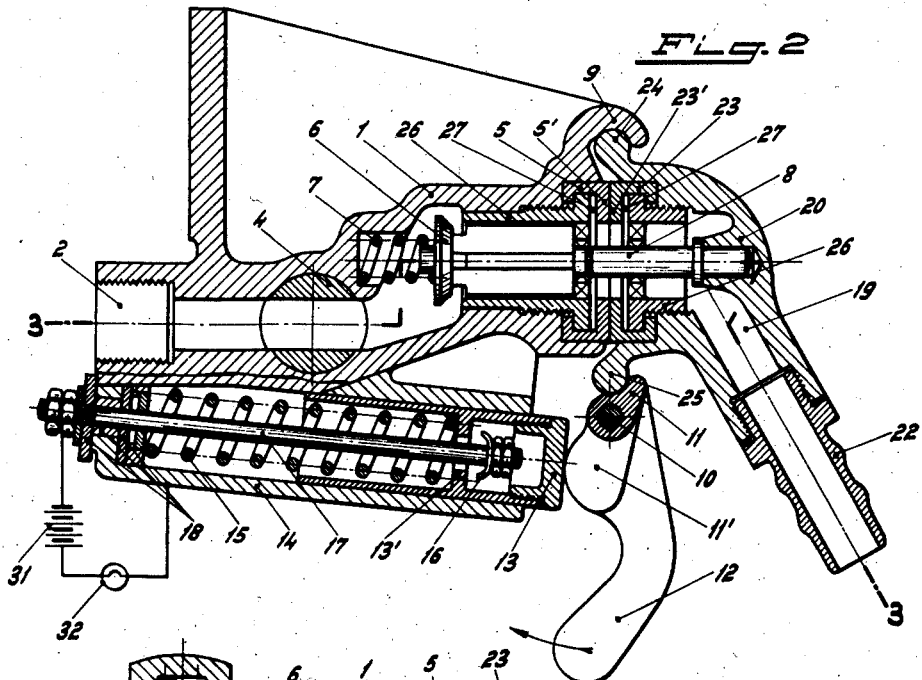
Fig. 2 is a central vertical section of a coupling of this invention on line 2—2 of Fig. 3.

In the illustrated embodiment said contactor includes a contact member 16 carried by a stem 17 fast in the chamber 14 and insulated therefrom by means of insulating parts 18, as well as a second contact provided by an inward collar 13' of the plunger 13 which is spaced from the stem 17; said collar 13' is held spaced from contact member 16 when the plunger 13 is held by head 11' and pawl 11 in the position illustrated in Fig. 2 due to the engagement of pawl 11 with the separable coupling member 20 at the time this member is engaged with coupling member 1; on the contrary said collar 13' engages the contact member 16 at the time the coupling member 20 is separated from member 1 and releases pawl 11 as hereinafter described.

The indicator circuit includes a suitable source of electric current shown at 31 and an indicator 32 as an electric lamp, said circuit having one end connected with the stem 17 and its other end connected with coupling member 1, chamber 14 and plunger 13 as illustrated diagrammatically in Fig. 2.

The separable coupling member includes a hollow head 20 having ducts 19, 21 adapted to be connected with ducts 2, 3 of the stationary member 1; said head 20 also carries a connector 22 for each of its ducts 19, 21 said connectors being intended for attaching one end of hoses 33 which may have at their opposite end a head 20' for cooperation with coupling member 1' fast on the frame 34 of an associated vehicle as shown in Fig 1.

Figure 3:
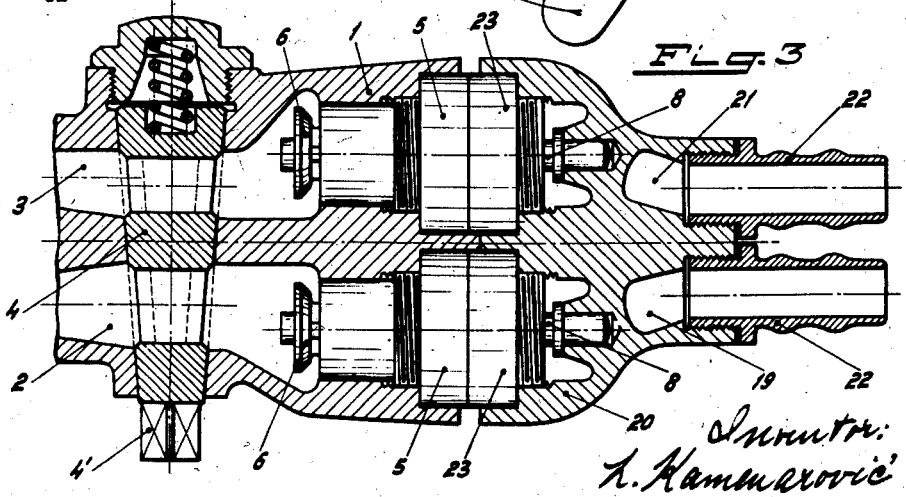
Fig. 3 is a section on line 3—3 of Fig. 2.

The head 20 includes seal rings 23 adapted to cooperate with similar rings 5 of the stationary member 1 and also fingers 8 operative on valves 6 to hold them in open position so long as the coupling members are intercoupled as shown in Figures 2 and 3 and as above stated.

Finally the separable coupling member 20 has a rounded knob 24 adapted to provide a releasable hinge engagement with the hook or seat 9 of member 1 as well as a nose 25 adapted for engagement with the pawl 11.

As above described and as illustrated, the interengaging means 9, 24 and 25, 11 respectively, are located on opposite edges of the faces of members 1 and 20 which abut on and interengage with each other, while the connectors 22 extend along a line inclined to the planes of said faces and passing substantially through the point of interengagement of knob 24 in the hook seat 9 said point being the centre of possible respective oscillation of members 1 and 20.

Assuming the coupling members 1 and 20 to be disconnected and they are required to be interengaged the operator acts on handle 12 clockwise in the direction of the arrow in Fig. 2 to remove the pawl 11 from way and holds said handle and pawl in such position; subsequently the head 20 is affixed on the stationary member 1 by firstly engaging the knob 24 thereof in the hook 9 of member 1 and by causing said head 20 to oscillate around the abutment of knob 24 in hook 9 until the rings 23 are caused to rest frontally on rings 5 of member 1, the fingers 8 at this time engaging the valves 6 and opening them; thereafter the operator releases the handle 12 and then the pawl 11 swings anticlockwise around its spindle 10 under the action of plunger 13 and spring 15 and engages the nose 25 of head 20 to lock this head over the stationary member 1 in the illustrated position while the collar 13' of plunger 13 is held removed from contact blade 16.

Assuming the two vehicles 34 and 30 to be connected by a draw bar or coupler 35 as illustrated in full lines in Fig. 1, the members 1 and 20 of the described coupling remain in the illustrated engaged conditions when the trailed vehicle is driven by the tractor by the intermediate of said bar 35, without the removable member 20 being acted on in the direction of its release by coupling hoses 33 because in the assumed conditions the said hoses are freely depending from the respective ends and connectors 22 as illustrated in full lines in Fig. 1, and their weight has no action to cause the head 20 to oscillate around hinge means 9, 24 for release, on account of the above described location of their line of action with respect to said hinge means.

Should the draw bar or coupler 35 fail during the travel and the distance intermediate the vehicles tend to increase in view of the fact that the tractor is further riding forward while the trailed vehicle tends to come at rest, said hoses 33 take the position illustrated in dotted lines in Fig. 1 and they act on the head 20 connected therewith to oscillate it in the direction of the arrow in Fig. 1 around the point of engagement of knob 24 in the hook seat 9 of member 1 fast on the vehicle frame; under such an action the nose 25 acts on the pawl 11 and causes it to oscillate clockwise around the spindle 10 it is pivoted on and overcome the action of spring 15 and plunger 13 thereon; said nose 25 is thus caused to be released from the pawl 11 and thereafter the knob 24 releases the hook 9 the head 20 being thus free to fall down from member 1 to secure the release of the coupling members 1 and 20 and of the vehicles.

At such time the plunger 13 moves under the action of the cooperating spring 15 and the collar 13' thereof engages the contact blade 16 to close the circuit 31, 32 and energise said indicator 32 while valves 6 close under the action of their springs 7 being released from fingers 8. Thereafter the ducts 2 and 3 may be finally shut off by the manipulation of hand valve 4, 4'.

The seal rings or packings 5 and 23 are conveniently made with channel or grooved section as shown in Figure 2 to provide flexible lips 5' and 23' spaced from flanged nipples 26 fastening said rings in position in the respective coupling members; the abutting lips 5' and 23' are thus heavily forced against each other by the compressed fluid existing in the ducts and operative in spaces 27 left by said grooved or channel section.

The coupling of this invention provides for making the engaging and releasing operations very easy and further it secures the advantage that the automatic separation occurs by a positive pull action as above described, without frictional actions, and therefore such disconnection is made entirely safe and certain at the time it is required; further the seal or packing members are caused to contact with each other to secure seal by pressure without being subject to frictional actions while under pressure, both at the time the coupling members are engaged and when separated by hand or automatic operation and their wear is thus avoided.

What I claim as my invention and desire to secure by United States Letters Patent is:

1. A coupling for vehicle conduits comprising two coupling members having faces adapted to abut on each other and registering duct outlets opening in said faces, cooperating hinge means on said members for their releasable interconnection with said faces in abutting contact with each other, a nose on one of said members in a region thereof opposite the said hinge means, a pivotal pawl on the other one of said members and adapted to cooperate with said nose to interengage said coupling members, the pivotal axis of said pawl being substantially aligned with the hinge center of said hinge means and with said nose in the interengaged position of said members, and spring means operative on said pawl for applying a pressure on said nose by said pawl to force said members elastically on each other with said abutting faces thereof in tight seal contact.

2. A coupling for vehicle conduits comprising two coupling members having faces adapted to abut on each other and registering duct outlets opening in said faces, cooperating hinge means on said members for their releasable interconnection with said faces in abutting contact with each other, a nose on one of said members in a region thereof opposite the said hinge means, a pivotal pawl on the other one of said members and adapted to cooperate with said nose to interengage said coupling members, the pivotal axis of said pawl being substantially aligned in a vertical direction with the hinge center of said hinge means and with said nose in the interengaged position of said members, and spring means operative on said pawl for applying a pressure on said nose by said pawl to force said members elastically on each other with said abutting faces thereof in tight seal contact.

3. A coupling for vehicle conduits comprising two coupling members having faces adapted to abut on each other and registering duct outlets opening in said faces, cooperating hinge means on said members for their releasable interconnection with said faces in abutting contact with each other, a nose on one of said members in a region thereof opposite the said hinge means, a pivotal pawl on the other one of said members and adapted to cooperate with said nose to interengage said coupling members, the pivotal axis of said pawl being substantially aligned with the hinge center of said hinge means and with said nose in the interengaged position of said members, spring means operative on said pawl for applying a pressure on said nose by said pawl to force said members elastically on each other with said abutting faces thereof in tight seal contact, and tubular connecting means on one of said members for attaching a hose thereto and leading to the said respective duct outlet, said hose connecting means extending on a line which is inclined to a horizontal line and lies in a vertical plane perpendicular to said abutting faces and passes through the center of oscillation of said coupling members about said hinge means.

4. A coupling for vehicle conduits comprising a first coupling member and a second coupling member, said members having faces adapted to abut on each other and registering duct outlets opening in said faces, a hinge hook and a pivotal pawl on one of said members at opposite regions of the edge of said abutting face thereof, said hook providing a recess open towards said pivotal pawl, anchoring parts on said second coupling member at opposite regions of the edge of said abutting face thereof for engagement in said hook recess and cooperation with said pawl respectively, and spring means operative on said pawl for applying a pressure on said cooperating anchoring part by said pawl to force said members elastically on each other with said abutting faces thereof in tight seal contact.

5. A coupling for vehicle conduits comprising a first coupling member and a second coupling member, said members having faces adapted to abut on each other and registering duct outlets opening in said faces, a hinge hook and a pivotal pawl on one of said members at opposite regions of the edge of said abutting face thereof, said hook providing a recess open towards said pivotal pawl, anchoring parts on said second coupling member at opposite regions of the edge of said abutting face thereof for engagement in said hook recess and cooperation with said pawl respectively, a handle fast with said pawl, and spring means operative on said pawl for applying a pressure on said cooperating anchoring part by said pawl to force said members elastically on each other with said abutting faces thereof in tight seal contact.

6. A coupling for vehicle conduits comprising a stationary coupling member and a movable coupling member, said members having faces adapted to abut on each other along a line at an angle with respect to a horizontal plane and registering duct outlets opening in said faces, a hinge hook on said stationary member at the top of said abutting face thereof and a pawl pivoted on said stationary member at the bottom of said face, said hook providing a recess open towards said pivotal pawl, anchoring parts on said movable coupling member at opposite regions of said edge of said abutting face thereof for engagement with said hook recess and cooperation with said pawl respectively, spring means operative on said pawl for applying a pressure on said anchoring part cooperating therewith to force said movable member elastically on said stationary member with said abutting faces thereof in tight seal contact, and tubular connecting means on one of said members for attaching a hose thereto and leading to the said respective duct outlet, said hose connecting means extending on a line which is inclined to a horizontal line and lies in a vertical plane perpendicular to said abutting faces and passes through the center of oscillation of said coupling members about said hinge means.

7. A coupling for vehicle conduits comprising a first coupling member and a second coupling member, said members having faces adapted to abut on each other and registering duct outlets opening in said faces, a hinge hook and a pivotal pawl on one of said members at opposite regions of the edge of said abutting face thereof, said hook providing a recess open toward said pivotal pawl, anchoring parts on said second coupling member at opposite regions of the edge of said abutting face thereof for engagement in said hook recess and cooperation with said pawl respectively, the pivotal axis of said pawl being substantially aligned with the hinge center of said hinge hook and with said anchoring parts in the interengaged position of said coupling members, and spring means operative on said pawl for applying a pressure on said cooperating anchoring part by said pawl to force said members elastically on each other with said abutting faces thereof in tight seal contact.

8. A coupling for vehicle conduits comprising two coupling members having faces adapted to abut on each other and registering duct outlets opening in said faces, cooperating hinge means on said members for their releasable interconnection with said faces in abutting contact with each other, a nose on one of said members in a region thereof opposite the said hinge means, a pivotal pawl on the other one of said members and adapted to cooperate with said nose to interengage said coupling members, the axis of the pivot of said pivotal pawl lying substantially in the same plane as the abutting face of the respective coupling member, and spring means operative on said pawl for applying a pressure on said nose by said pawl to force said members elastically on each other with said abutting faces thereof in tight seal contact.

9. A coupling for vehicle conduits comprising a first coupling member and a second coupling member, said members having faces adapted to abut on each other and registering duct outlets opening in said faces, a hinge part and a pivotal pawl on one of said members in opposite regions thereof for cooperation with said hinge part and pivotal pawl of said first coupling member to interengage said coupling members, said hinge parts, nose abutting faces and pawl being substantially aligned in the interengaged position of said coupling members, and spring means operative on said pawl for applying a pressure on said nose by said pawl to force said members elastically on each other with said abutting faces thereof in tight seal contact.

10. A coupling for vehicle conduits comprising a first coupling member and a second coupling member, said members having faces adapted to abut on each other and registering duct outlets opening in said faces, a hinge part and a pivotal pawl on one of said members in opposite regions thereof, said hinge part providing a recess open towards said pivotal pawl, a hinge part and a nose on said second coupling member in opposite regions thereof for cooperation with said hinge part and pivotal pawl of said first coupling member to interengage said coupling members, said hinge parts, nose, abutting faces and pawl being substantially aligned in the interengaged position of said coupling members, and spring means operative on said pawl for applying a pressure on said nose by said pawl to force said members elastically on each other with said abutting facts thereof in tight seal contact.

LEONE KAMENAROVIČ.